United States Patent [19]
Angelopoulos et al.

[11] Patent Number: 5,962,632
[45] Date of Patent: *Oct. 5, 1999

[54] DEAGGREGATED ELECTRICALLY CONDUCTIVE POLYMERS AND PRECURSORS THEREOF

[75] Inventors: Marie Angelopoulos, Cortlandt Manor; Bruce K. Furman, Beacon, both of N.Y.

[73] Assignee: International Business Machines Corporation, Armonk, N.Y.

[*] Notice: This patent is subject to a terminal disclaimer.

[21] Appl. No.: 08/911,262

[22] Filed: Aug. 14, 1997

Related U.S. Application Data

[63] Continuation of application No. 08/370,127, Jan. 9, 1995, Pat. No. 5,804,100.

[51] Int. Cl.[6] .............................. C08G 73/00; C08F 2/08
[52] U.S. Cl. .................. 528/488; 528/490; 528/491; 528/210; 528/422; 524/910
[58] Field of Search .................... 252/521, 500, 252/521.6; 528/210, 212, 214, 422, 480, 482, 488, 490, 491, 373, 377; 524/910

[56] References Cited

U.S. PATENT DOCUMENTS

| | | | |
|---|---|---|---|
| 5,217,649 | 6/1993 | Kulkarni et al. | 252/500 |
| 5,232,631 | 8/1993 | Cao et al. | 252/500 |
| 5,264,552 | 11/1993 | Abe et al. | 528/422 |
| 5,276,112 | 1/1994 | MacDiarmid et al. | 525/540 |
| 5,324,453 | 6/1994 | Cao et al. | 252/500 |
| 5,403,913 | 4/1995 | MacDiarmid et al. | 528/495 |
| 5,519,111 | 5/1996 | MacDiarmid et al. | 528/422 |
| 5,520,852 | 5/1996 | Ikkala et al. | 252/521 |
| 5,595,689 | 1/1997 | Kulkarni et al. | 252/500 |
| 5,720,903 | 2/1998 | Wessling et al. | 252/500 |
| 5,736,623 | 4/1998 | Angelopoulos et al. | 528/422 |
| 5,840,214 | 11/1998 | Kinlen | 252/500 |
| 5,871,671 | 2/1999 | Kinlen et al. | 252/500 |

FOREIGN PATENT DOCUMENTS

92/22911 12/1992 WIPO.

OTHER PUBLICATIONS

Cao, Yong, et al., "Optical–quality transparent conductive polyaniline films", Synth. Met., 57(1), 3526–31. *Month not known, 1993.

*Primary Examiner*—Mark Kopec
*Attorney, Agent, or Firm*—Daniel P. Morris

[57] ABSTRACT

Deaggregated substituted and unsubstitued polyparaphenylenes, polyparaphenylevevinyles, polyanilines, polyazines, polythiophenes, poly-p-phenylene sulfides, polyfuranes, polypyrroles, polysclenopliene, polyacetylenes formed from soluble precursors and combinations thereof and copolymers thereof and methods of fabrication are described. The deaggregated polymer molecules when subsequently doped show higher electrical conductivity. Agents such as lithium chloride, m-cresol and nonylphenol are used to deaggregate the polymer molecules. The deaggregating agents can be added prior to or during doping the molecules.

7 Claims, 11 Drawing Sheets

FIG. 3
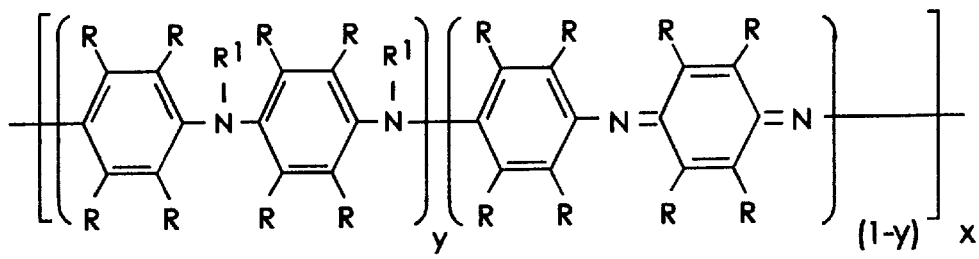
FIG. 4.1
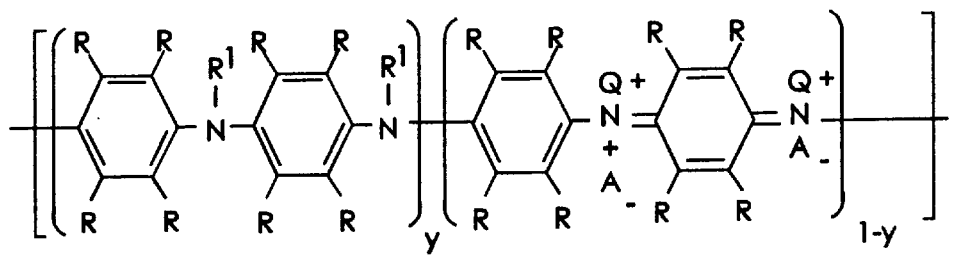
FIG. 4.2
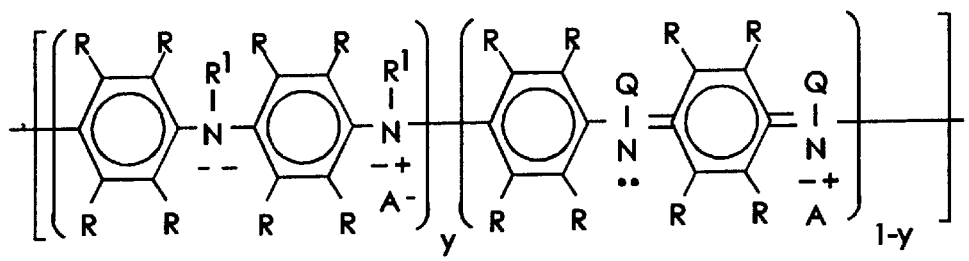

DEAGGREGATED ELECTRICALLY CONDUCTIVE POLYMERS AND PRECURSORS THEREOF

CROSS REFERENCE TO RELATED APPLICATION

This is a continuation of application Ser. No. 08/370,127, filed Jan. 9, 1995 now U.S. Pat. No. 5,804,100.

The teaching of U.S. application Ser. No. 08/370,128 entitled "Methods of Fabrication of Deaggregated Electrically Conductive Polymers and Precursors Thereof" to M. Angelopoulos and B. Furman, filed on the same day herewith is incorporated herein by reference.

FIELD OF THE INVENTION

The present invention is directed to methods of fabrication of electrically conducting polymers having enhanced electrical conductivity. In particular, the present invention is directed to methods to deaggregate electrically conductive polymers and precursors thereof.

BACKGROUND OF THE INVENTION

Electrically conductive organic polymers have been of scientific and technological interest since the late 1970's. The relatively new materials exhibit the electronics and magnetic properties characteristic of metals while retaining the physical and mechanical properties associated with conventional organic polymers. Herein we describe electrically conducting polyparaphenylene vinylenes, polyparaphenylenes, polyanilines polythiolphenes, polyazines, polyfuranes, polypyrroles, polyselenophenes, poly-p-phenylene sulfides, polyacctylenes formed from soluble precursors, combinations thereof and blends thereof with other polymers and copolymers of the monomers thereof. In order for these materials to be used in place of metals in more applications, it is desirable to increase the conductivity of these materials.

The article "The Concept of Secondary Doping as Applied to Polyaniline", A. G. MacDiarmid, A. J. Epstein, Synthetic Metals, 65 (1994), 103–116, describes increasing the electrical conductivity of a polyanilinie by exposing a doped polyaniline to a secondary dopant, such as meta-cresol. MacDiarmid et al. teaches that the secondary dopant results in an intra-molecular conformational change in the polyaniline molecule. Prior to being exposed to the secondary dopant, the doped polyaniline molecule is in a compact coil intra-molecular conformation. Intra-molecular conformation refers to the conformation of a single molecule or a single polymer chain in which the molecular chain is coiled around itself. In contra-distinction inter-molecular structure refers to the structural arrangement of more than one molecule or polymer chain in which the molecules or chains are bonded together of coiled around each other forming aggregates. These aggregates are then comprised of many polymer chains intertwined or entangled. MacDiarmid et al. teaches that the secondary dopant causes a intra-molecular comformational change, i.e., the molecule or the chain unravels and assumes an expanded coil conformation. A film of this expanded coil polyaniline has enhanced electrical conductivity because of an increase in the crystallinity of the material formed from the aggregated straightened molecules.

In the article "Transport studies of protonated emeraldine powder: A granular polymeric metal system", F. Zuo et al., Phys. Rev. B 36, 3475 (1987) it has been reported that the polyaniline which has been doped has electrically conductive regions or islands which are of the order of 200–300 Å. The spaces between these regions are significantly less electrically conductive. When an electrical current flows along tile polyaniline molecules, current flows through the electrically conductive regions and hops over the less electrically conductive region to an adjacent electrically conductive region.

It is an object of the present invention to increase the electrical conductivity of electrically conductive polymers.

It is another object of the present invention to enhance the electrical conductivity of an electrically conductive polymer by deaggregating aggregated molecules which are precursors of the electrically conducting polymers so that the molecules can be more uniformly doped.

It is another object of the present invention to deaggregate polymer molecules prior to being doped to the electrically conducting state.

It is another object of the present invention to lower the glass transition temperature of the precursor to an electrically conductive polymer and of an electrically conductive polymer by the addition of deaggregating agents.

It is another object of the present invention to increase the electrical conductivity of electrically conductive polymers by extending the electrically conductive regions or islands of the electrically conductive polymer.

It is another object of the present invention to further increase the electrical conductivity of a deaggregated electrically conductive polymer by stretch orientation.

It is another object of the present invention to increase the shelf-life of a precursor to an electrically conductive polymer and of an electrically conductive polymer by the addition of deaggregating agents.

SUMMARY OF THE INVENTION

A broad aspect of the present invention is an electrically conductive polymer having electrically conductive regions having a dimension greater than about 300 Å.

Another broad aspect of the present invention is a precursor to an electrically conductive polymer containing a deaggregating agent, such as a complexing agent.

IN a more particular aspect of the present invention, the dimension of the electrically conductive regions are enhanced by a deaggregating agent.

Another broad aspect of the present invention is a body of material containing precursor molecules to electrically conductive molecules wherein the body of material has regions of aggregated precursor molecules of less than about 100 nm.

BRIEF DESCRIPTION OF THE DRAWINGS

Further objects, features, and advantages of the present invention will become apparent from a consideration of the following detailed description of the invention when read in conjunction with the drawing FIGS., in which:

FIG. 3 is a general formula for a polyaniline.

FIG. 4.1 is a general formula for a doped polyanilinie.

FIG. 4.2 is a general formula for the polysemiquinone radical cation form of doped polyaniline.

DETAILED DESCRIPTION

The present invention is directed to enhancing the electrical conductivity of polymer materials, which when doped, are electrically conducting. Example of polymers which can be used to practice the present invention are of substituted and unsubstituted polyparaphenylenes, polyparaphenylevevinylenes, polyanilines, polyazines, polythiophenes, poly-p-phenylene sulfides, polyfurances, polypyrroles, polyselenophenes. polyacetylenes formed from soluble precursors and combinations thereof and copolymers of monomers thereof. The general formula for these polymers can be found in U.S. Pat. No. 5,198,153 to Angelopoulos et al. The present invention will be described with reference to one type of polymer which is a substituted or unsubstituted polyaniline or copolymers of polyaniline having general formula shown in FIG. 3 wherein each R can be H or any organic or inorganic radical; each R can be the same or different; wherein each $R^1$ can be H or any organic or inorganic radical, each $R^1$ can be the same or different; $x \geq 1$; preferably $x \geq 2$ and y has a value from 0 to 1. Examples of organic radicals are alkyl or aryl radicals. Examples of inorganic radicals are Si and Ge. This list is exemplary only and not limiting. The most preferred embodiment is emeraldine base form of the polyaniline wherein y has a value of approximately 0.5.

In FIG. 4.1 polyaniline is shown doped with a dopant. If the polyaniline base is exposed to cationic species QA, the nitrogen atoms of the imine part of the polymer becomes substituted with the Q+ cation to form an emeraldine salt is shown in FIG. 4.1. Q+ can be selected from H+ and organic or inorganic cations, for example, an alkyl group or a metal.

QA can be a protic acid where Q is hydrogen. When a protic acid HA is used to dope the polyaniline, the nitrogen atoms of the imine part of the polyaniline are protonated. The emeraldine base form is greatly stabilized by resonance effects. The charges distribute through the nitrogen atoms and aromatic rings making the imine and amine nitrogens indistinguishable. The actual structure of the doped form is a delocalized polysemiquinone radical cation as shown in FIG. 4.2.

The emeraldine base form of polyaniline is soluble in various organic solvents and in various aqueous acid solutions. Examples of organic solvents are dimethylsulfoxided (DMSO), dimethylformamide (DMF) and N-methylpyrrolidinone (NMP). This list is exemplary only and not limiting. Examples of aqueous acid solutions is 80% acetic acid and 60–88% formic acid. This list is exemplary only and not limiting.

Although the present invention is described in terms of polyaniline, it is not limited thereto.

Figure 1:
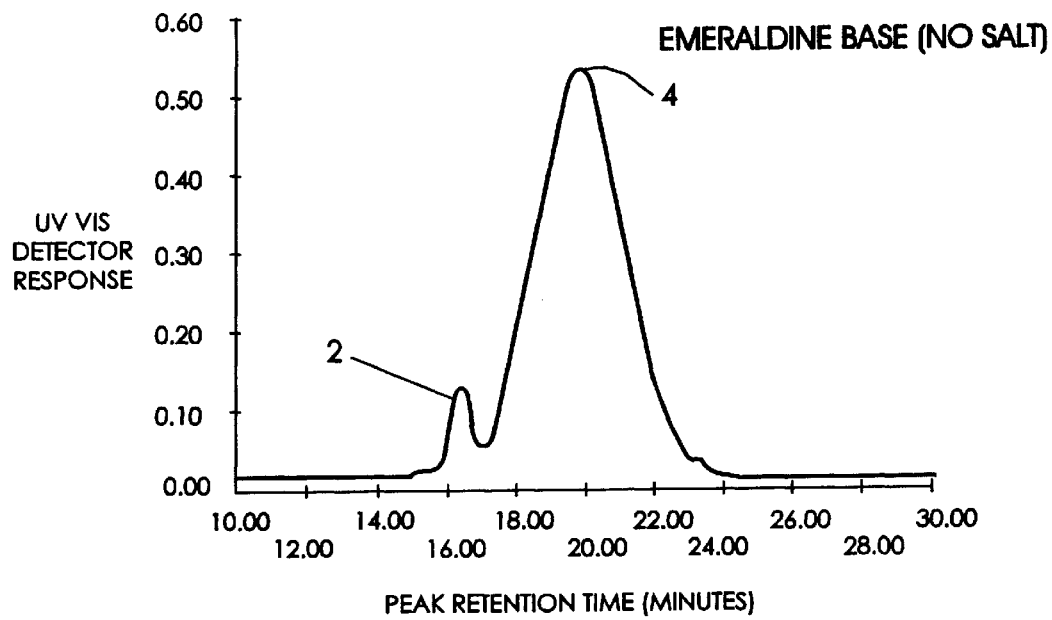
FIG. 1 is a gel permeation chromatograph (GPC) p)lot of polyaniline base in NMP which shows a bimodal distribution: a very high molecular weight component which is aggregated polyaniline molecules and a lower molecular weight peak.

FIG. 1 shows a GPC (gel permeation chromatograph) of polyaniline in the base form dissolved in 100% solvent N-methylpyrrolidine (NMP). The vertical axis is the ultraviolet visible (UV VIS) detector response and the horizontal axis is the peak retention time in minutes. Two peaks are evident in FIG. 1, peak 2 which corresponds to a weight average molecular weight of approximately 371,700 and peak 4 which corresponds to a weight average molecular weight of approximately 29,500.

Figure 2:
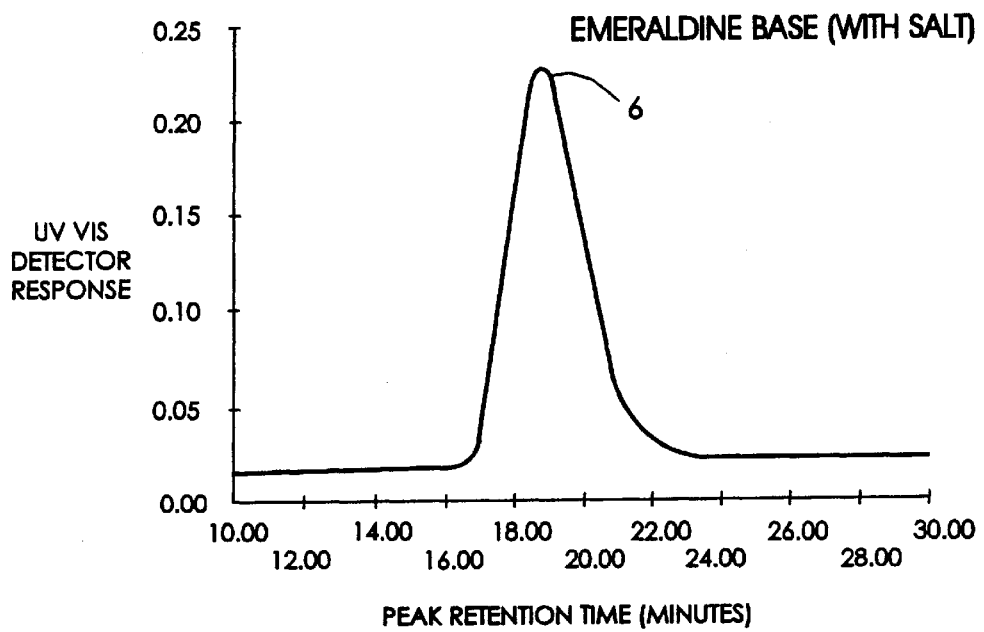
FIG. 2 shows a GPC plot of polyaniline base in NMP and 0.5 wt % lithium chloride which shows that the high molecular weight peak of FIG. 1 has been eliminated and the molecular weight of the other peak is actually higher.

FIG. 2 shows the GPC of polyaniline in the base form in NMP/0.5 wt % lithium chloride (LiCl) which shows a single peak 6 corresponding to a weight average molecular weight of approximately 45,500. It is evident in comparing FIG. 1 to FIG. 2 that the high molecular weight peak 2 of FIG. 1 has disappeared and that the molecular weight of the major peak is higher than that in NMP, corresponding to a higher hydrodynamic volume.

Figure 5:
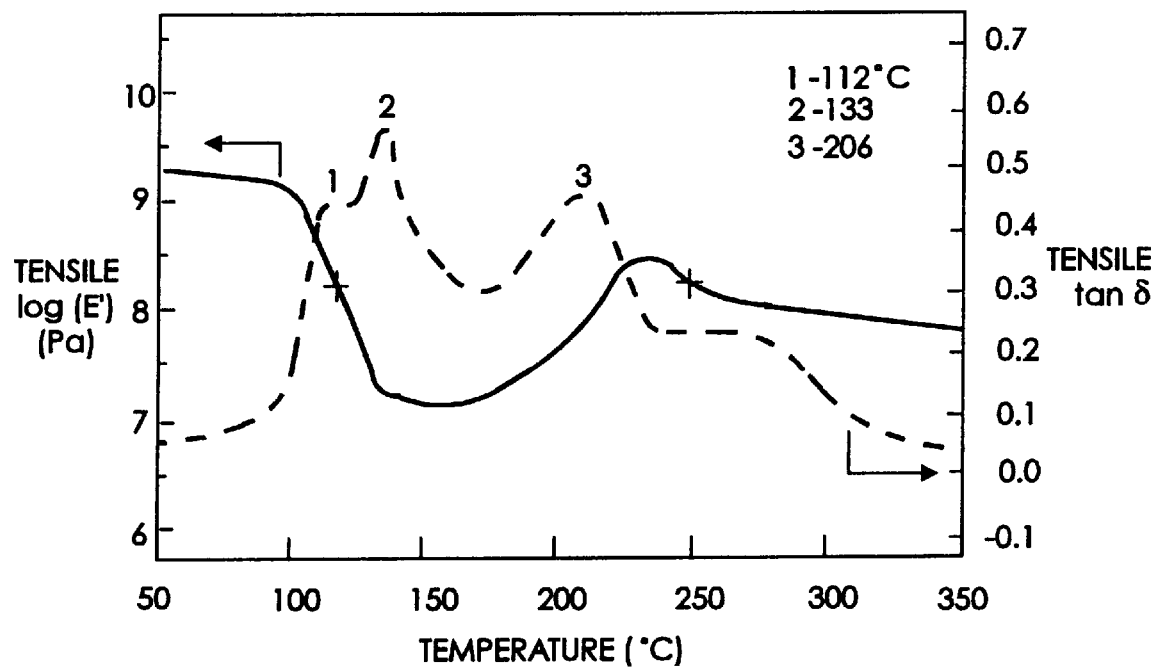
FIG. 5 is a Dynamic Mechanical Thermal Analysis (DMTA) plot of polyaniline base film cast from 100% NMP. (First Run; ~21% NMP remaining in film; under $N_2$; 2° C./$_{min}$)

FIG. 5 is a plot of a first run of a dynamic mechanical thermal analysis (DMTA) plot of an undoped polyaniline base film cast from 100% NMP. The as-cast film contains approximately 21% NMP which is determined from thermo gravimmetric analysis. The dashed line in FIG. 5 which is the plot of tan (δ) shows several transitions of which some are related to the residual solvent.

Figure 6:
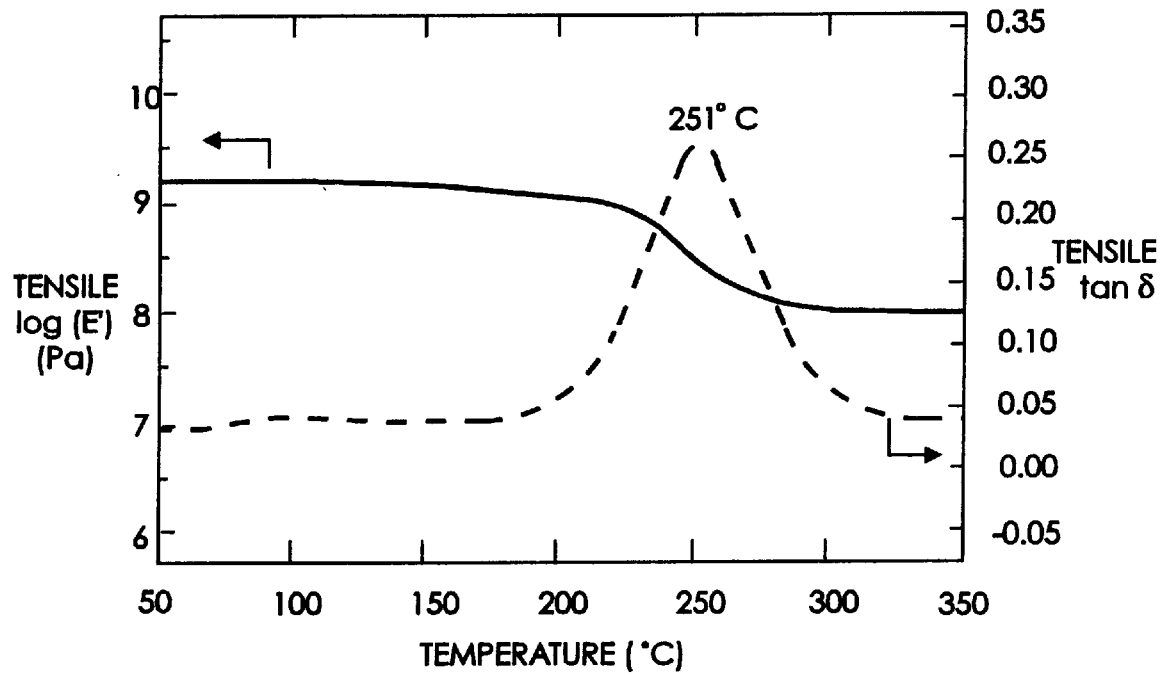
FIG. 6 is the DMTA plot (2nd run) of the same poylaniline film as shown in FIG. 5. This film has 0% NMP remaining in the film. The Tg is 251° C.

FIG. 6 shows a plot of a DMTA (second run) of the same material as for FIG. 5. The solvent is substantially driven off in the first run. The single peak of the dashed curve which corresponds to the tan (δ) measurement shows that the polyaniline base has a glass transition temperature ($T_g$) of 251° C.

Figure 7:
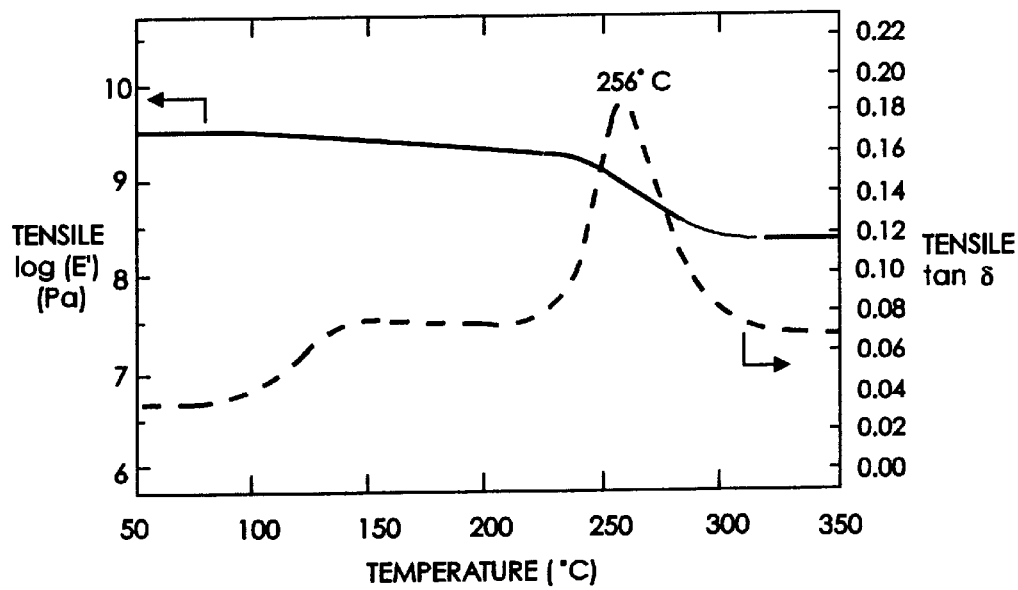
FIG. 7 is a DMTA plot (2nd run) of polyaniline base which has been cast from 100% NMP doped with 1N HCl and undoped with 0.1 M $NH_4OH$ showing a Tg of 256° C. This film has ~2.8% NMP remaining in the film.

FIG. 7 shows a plot of a DMTA (second run) for polyaniline base, cast from 100 wt % NMP, which has been doped in 1N HCl and subsequently undoped with 1M $NH_4OH$. Most of the NMP was removed in the process. It has been determined from thermogravimmetric analysis (TGA) that there is only 2.8% NMP remaining in the film. The glass transition temperature of this sample is 256° C, relatively the same as that measured for the sample of FIG. 6.

Figure 8:
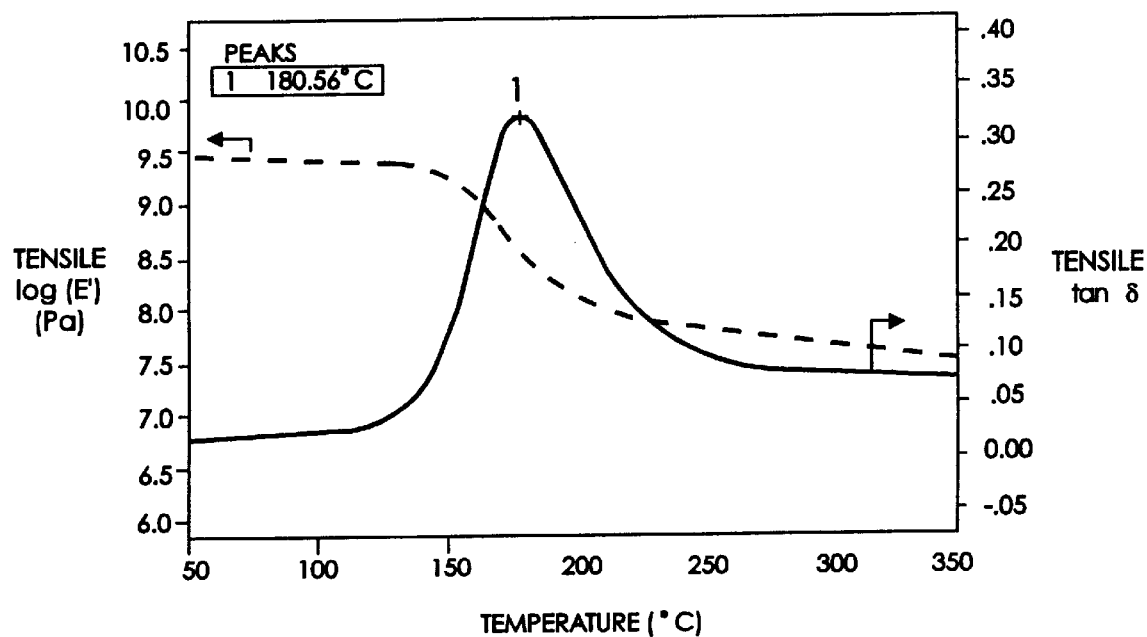
FIG. 8 is a DMTA plot (2nd run) of polyaniline cast from NMP/0.5 wt % LiCl showing a Tg of 180° C.

FIG. 8 shows a plot of a DMTA (second run) of polyaniline base cast from 99.5 wt % NMP/0.5 wt % lithium chloride. The peak in the tan(δ) curve gives a $T_g$ of 180° C.

Table 1 summarizes the results of FIGS. 5–8 and also gives additional results for films cast from combinations of NMP and m-cresol and a surfactant nonylphenol.

TABLE I

| Material | History | Tg from DMTA (°C.) |
|---|---|---|
| Polyaniline Base Cast from 100% NMP | Thermally annealed* (0% residual NMP in film) | 251 |
| Polyaniline Base cast from 100% NMP | Doped with HCL undoped in ammonia (2.8% residual NMP in film) | 256 |
| Polyaniline Base cast from 90 wt % NMP/10 wt % m-cresol | Thermally annealed* | 186 |
| Polyaniline Base cast from 75 wt % NMP/25 wt % m-cresol | Thermally annealed* | 175 |
| Polyaniline Base cast from 99.5 wt % NMP/ 0.5 wt % LiCL | Thermally annealed* | 180° C. |
| Polyaniline Base cast from 99 wt % NMP/1 wt % nonylphenol | Thermally annealed* | 222° C. |

*Thermally annealed—scanned to 350° C. under $N_2$ at 2° C./min

The drop in glass transition temperature of the polyaniline base upon exposure to an additive such as m-cresol, LiCl and nonylphenol indicates that there is a drop in the crosslink density of the polyaniline base material as a result of deaggregation of the polyaniline base molecules. While applicant's do not want to be limited to a particular theory, this cross-link is believed to be in the form of inter-chain or intermolecular hydrogen bonding.

Figure 9:
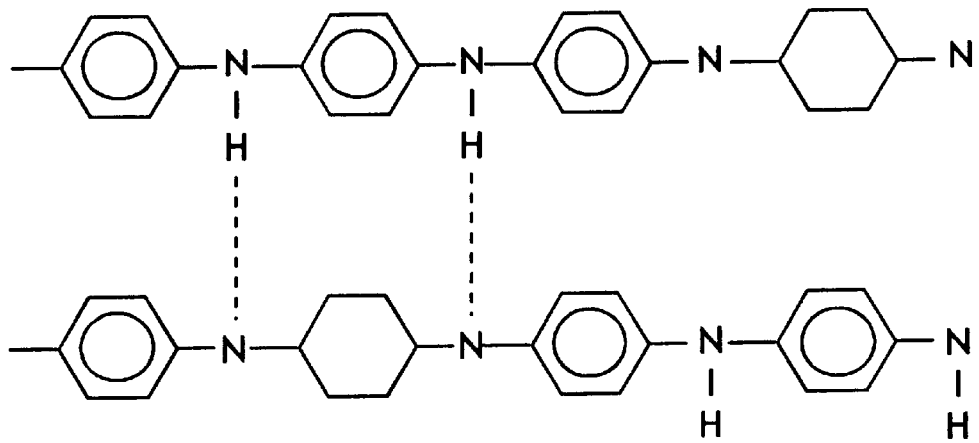
FIG. 9 shows inter-molecular hydrogen bonding between undoped polyaniline molecules.

FIG. 9 shows two polyaniline base molecules wherein a hydrogen atom from an amine site on one molecule is hydrogen bonded as represented by the dashed line to an imine nitrogen on an adjacent molecule.

Figure 10:
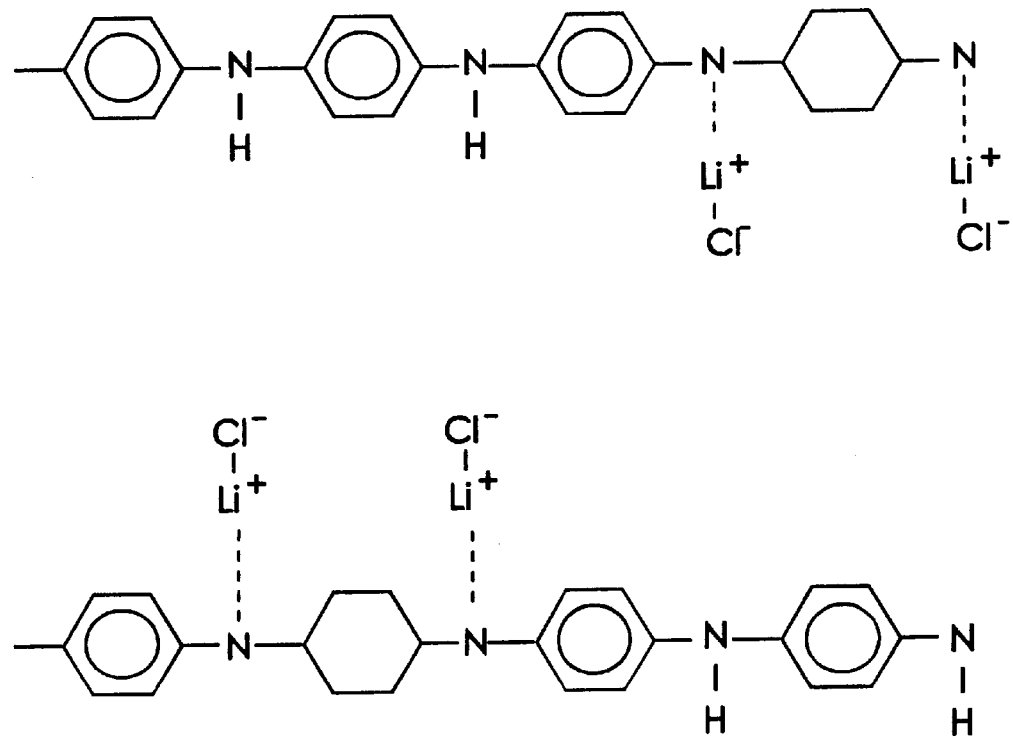
FIG. 10 shows disruption of the intermolecular hydrogen bonding by a LiCl salt.

FIG. 10 shows the effect of adding lithium chloride to the arrangement shown in FIG. 9. The lithium chloride can complex with the imine nitrogen lone pairs as shown in the FIG. 10 thereby disrupting the interchain hydrogen bonding between polyaniline chains.

Figure 11:
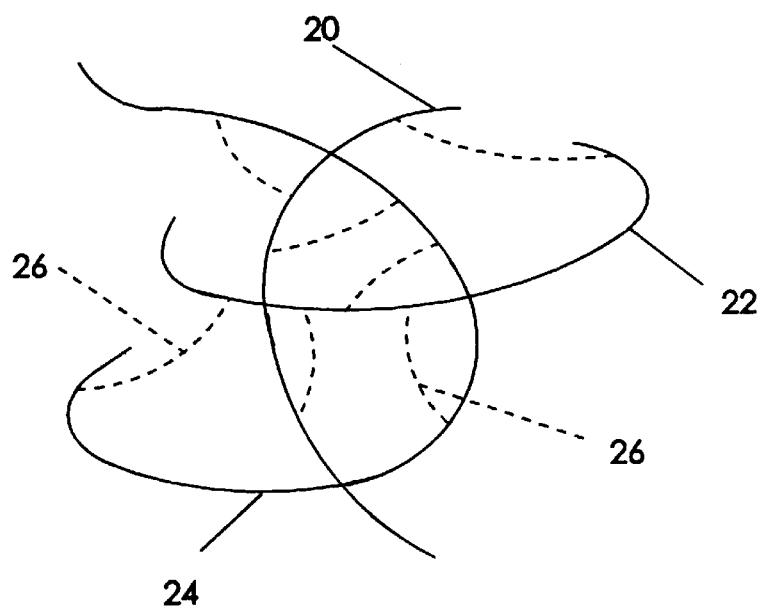
FIG. 11 shows a schematic view of polyaniline molecules aggregated through inter-molecular hydrogen bonding.

FIG. 11 is a schematic diagram showing three polyaniline molecules 20, 22 and 24 wherein there are a plurality, of hydrogen to bonds 26 interlocking each of the three polyaniline molecules shown. It is evident from Fig. 11 that where there is a high density of hydrogen bonding between adjacent polyaniline molecules, there is effective crosslinking between the molecules which will affect the glass transition temperature of a polyaniline material. (Generally the glass transition temperature increases as the cross-linking density increases.) The high degree of crosslink density will result in a significant degree of aggregation of polyaniline molecules. The atomic force micrograph (AFM)(FIG. 15) of the polyaniline film processed from 100% NMP shows "clusters" or "bundles" on the order of 100 nm. This structure agrees well with previous results on evaporated films (no solvent) by T. L. Porter et al., Surface Science, 293, 81 (1993). When the hydrogen bonded and ravelled molecules of FIG. 11 are exposed to a deaggregating agent such as LiCl, an intermolecular structural change occurs wherein the molecules are no longer hydrogen bonded and the molecules are unravelled and deaggregated.

The present results together with the previous results by Porter indicate that polyaniline in the solid-state is highly aggregated. (Examples of solid state forms of polymers are powders and films.) When the polyanilinie is then dissolved in NMP, the NMP does not appreciably solvate the polyaniline to disrupt the interchiain interactions of the polyaniline and the material remains aggregated. When the polyaniline molecules are exposed to a dopant, this high degree of aggregation will prevent the dopant from being able to dope all regions of the polyaniline molecules uniformly and may be responsible for the formation of the metallic islands characteristic of conducting polyaniline (described above) which are approximately 200–300 Å. This will result in less than an optimal conductivity for a doped polyaniline material. If the aggregated polyaniline molecules are deaggregated by the methods according to the present invention, the polyaniline molecules will be more effectively doped when contacted with a dopant. In this fashion the size of the metallic islands may in turn be increased above 200–300°A thereby enhancing the mobility of the carriers, and in turn the electrical conductivity. It may be possible to ultimately eliminate the formation of islands by more uniform doping; in this fashion the material would be more homogeneous and hopping through less conducting regions to go from metallic island to metallic island would thereby be eliminated.

An exemplary list of solvents useful to practice the present invention is:

List of Solvents

N-methyl pyrrolidinone (NMP)
dimethyl sulfoxide (DMSO)
dimethyl formamide (DMF)
pyridine
toluene
xylene
m-cresol
phenol
dimethylacctamide
tetramethylurea
n-cyclohexylpyrrolidinone
aqueous acetic acid
aqueous formic acid
pyrrolidinone
$N_1N'$ dimethyl propylene urea (DMPU)
benzyl alcohol
water An exemplary list of salts which can be used as a deaggregation agent or additive is:

Salts lithium chloride
lithium bromide
lithium iodide
lithium fluoride lithium tetrafluoroborate
lithium hexafluorophosphate
lithium perchlorate
lithium phenoxide
lithium triflate
lithium niobate
magnesium bromide
magnesium chloride
magnesium ethoxide
magnesium fluoride
magnesium sulfate
magnesium perchlorate
magnesium nitrate
sodium bromide
sodium chloride
sodium chlorate
sodium hexafluorophosphate
potassium bromide
potassium chlorate
potassium chloride
potassium fluoride
potassium hexafluorophosphate
rubidium chloride
rubidium fluoride
rubidium nitrate
cesium bromide
cesium chloride
cesium floride
cesium iodide
calcium bromide
calcium chloride
calcium iodide
calcium nitrate
barium chloride
barium fluoride
barium iodide
barium sulfate
barium perchlorate
tetrabutylammonium chloride
tetrabutylammonium fluoride
tetrabutylammonium hexafluorophosphate
tetrabutylammonium iodide
tetrabutylammonium nitrate
tetraethylammonium iodide, etc.
tetramethylammonium bromide, etc.
tetrapentylammonium bromide, etc.

An exemplary list of surfactants which can be used is a deaggregation agent or additive is:
Surfactants Reference: Encyclopedia of Chemical Technology 3rd Edition, K. Othmer, Wiley-Interscience, Pub., vol. 22, p. 332
Cationic, anionic, nonionic, and amphoteric surfactant included.
 Examples of each are given below:
 (1) anionic surfactants—Examples
  i) Carboxylates RCOOM R is hydrocarbon chain M is a metal or ammonium ion
   e.g., 3M Fluorad series, polyalkoxycarboxylates
  ii) sulfonates $RSO_3M$ R is alkyl, aryl, or alkylaryl groups M is a metal or ammonium ion
   e.g., alkylbenzene sulfonates such as dodecylbenzene sulfonate sodium salt, nonylbenzene sulfonate sodium salt, nonylnaphthalene sulfonate sodium salt
   alkylarenesulfonates, lignosulfonates, naphthalenesulfonates, alpha-olefinsulfonates, sulfonates with ether, amide, or ether linkages, such as dialkyl sulfosuccinates etc.
  iii) sulfates $R-OSO_3M$
   alkyl sulfates such as octylsulfate sodium salt, 2-ethylhexyl sodium salt, dodecylsulfate sodium salt, dodecylsulfate lithium salt, lauryl sulfate potassium salt, alcohol sulfates ethoxylated alcohol sulfates. sulfated alkylphenol ethoxylates
  iv) phosphates
   e.g., phosphate esters such as potassium butylphosphate, potassium hexylphosphate, phenol ethoxylated and phosphated, nonylphenol ethoxylated and phosphated, dodecylphenol ethoxylated and phosphated, etc.
 (2) nonionic surfactants—Examples
  i) polyoxyethylene surfactants (ethoxylates)
   alcohol ethoxylates $R[OCH_2CH_2]_nOH$
   alkylphenol ethoxylates $RC_6H_4(OC_2H_4)_nOH$
   e.g., Triton N-57
   Triton N-111
   Triton X-45
   Triton X-102
   Triton X-305
   Triton X-705
  ii) alkylphenols, e.g. nonylphenol, docecylphenol
  iii) glycerol esters of fatty acids
  iv) polyoxyethylene esters
  v) carboxylic amides
  vi) polyoxyethylene fatty acid amides
  vii) polyalkylene oxide block copolymers
  viii) poly(oxyethylene-co-oxypropylene)
   e.g., pluronic series
 (3) cationic surfactants
  aliphatic mono, di, and polyamines derived from fatty and rosin acids
  alkylamine ethoxylates
  amine oxides
  alkoxylates of ethylenediamine
  2-alkyl-1-(2-hydroxyethyl)-2-imidazolines
  quaternary ammonium salts
   e.g. dialkyldimethylammonium salts alkylbenzyldimethylammonium chlorides alkylpyridinium halides
 (4) amphoteric surfactants
  Examples: imidazolinium derivatives alkylbetaines amidopropylbetaines, etc.
An exemplary list of acidic additives which can be used as a deaggregation agent or additive is:
Acidic Additives
 (1) Preferred acidic additives naphthol
thiocresol
2-hyoxydibenzofuran
1-[2-(2-hydroxyethoxy)ethyl]piperazine
2-hydroxy-9-fluorenone
5-hydroxyisoquinoline
2-hydroxy-1,4 naphthoquinone
1-hydroxypyrene
9-hydroxyxanthene
indophenol
dihydroxynaphthalene
4-propyl resorcinol
2-isopropylhydroquinone
2,6-bis(hydroxymethyl)-p-cresol resorcinol
catechol
hydroquinone
pyrogallol
benzylalcohol
hydroxybenzylalcohol
trihydroxytoluence
iminodiphenol (2) Acidic additives also include:

m-cresol
phenol
4-propoxyphenol

An exemplary list of dopants which can be used to dope the polymer to the conducting state are: hydrochloric acid, acetic acid, formic acid, oxalic acid, toluenesulfonic acid, dodecylbenzene sulfonic acid, benzenesulfonic acid, naphthalene sulfonic acid, methyliodide and camphor sulfonic acid.

When deaggregation is done in solution the deaggregating agent is present in an amount less than about 25 wt %. When deaggregation is done in solution using a salt as the deaggregation agent, the salt is preferably present in an amount from about 0.00001 wt % to about 5 wt %, more preferably from about 0.0001 wt % to about 2.5 wt %; most preferably from about 0.001 wt % to about 1 wt %. When the deaggregation is done in solution using a surfactant as the deaggregation agent, the surfactant is preferably present in an amount from about 0.0001 wt % to about 10 wt %; more preferably from about 0.001 wt % to about 5 wt %; most preferably from about 0.01 wt % to about 2.5 wt %. When the deaggregation is done in solution using an acidic additive as the deaggregation agent, the acidic additive is preferably present in an amount from about 0.0001 wt % to about 25 wt %; preferably from about 0.001 wt % to about 15 wt %; most preferably from about 0.01 wt % to about 10 wt %.

Figure 15:
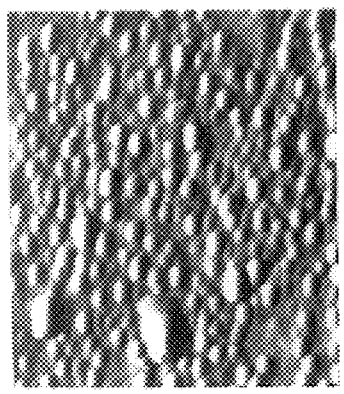
FIG. 15 is an atomic force micrograph of a polyaniline film cast from 100 NMP showing clusters or bundles of polyaniline molecules of about 100 nm in size which are interpreted as aggregated regions.
Figure 16:
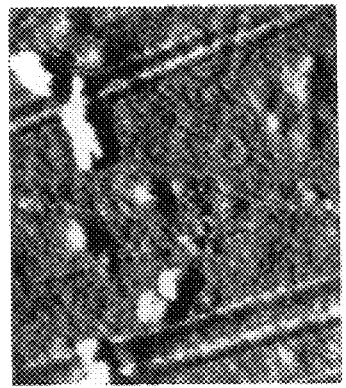
FIG. 16 is an atomic force micrograph of polyaniline film cast from NMP and subsequently exposed to m-cresol.
Figure 17:
FIG. 17 is an atomic force micrograph of the same material shown in FIG. 16 with the m-cresol pumped out.
Figure 18:
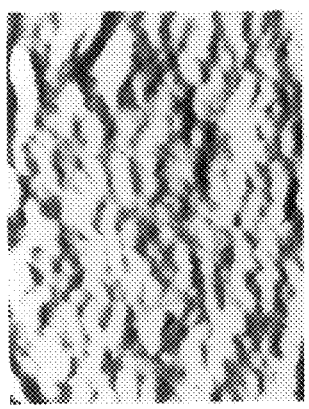
FIG. 18 is an atomic force micrograph of a polyaniline film cast from NMP and treated with 0.5 wt % nonylphenol showing deaggregation.
Figure 19:
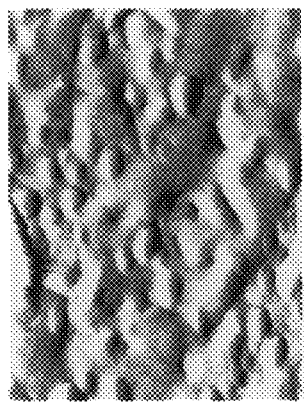
FIG. 19 is an atomic force micrograph of a polyaniline film cast from NMP and treated with 0.5 wt % triton showing deaggregation.
Figure 20:
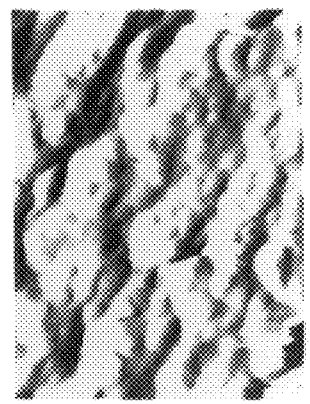
FIG. 20 is an atomic force micrograph of a polyaniline film cast from NMP and treated with 1.0 wt % nonylphenol showing more deaggregation thin shown in FIG. 19.

FIGS. 15, 16, 17, 18, 19 and 20 are atomic force micrographs each having a dimension of 1000nm×1000 nm. FIG. 15 is for polyaniline base cast from 100% NMP; FIG. 16 is for polyaniline cast from 100% NMP and subsequently exposed to m-cresol; and FIG. 17 of the same sample as in FIG. 16 with the m-cresol pumped out an shows no tendency to re-aggregate. FIG. 15 shows aggregated regions of the order of 100 nm. FIG. 16 shows the substantial elimination of the aggregated regions caused by exposure to the deaggregating agent, m-cresol, which remains when the m-cresol is removed. Therefore, the deaggregated structure is locked or remains without the deaggregating agent. FIG. 15 shows bundles of aggregated regions which are not present in FIG. 16 and 17. FIGS. 18, 19 and 20 show similar results for treatment with nonylphenol and triton surfactant. The level of deaggregation is not as complete as in FIG. 16 but shows the onset of deaggregation.

Basic Synthesis of Polyaniline
Unsubstituted Polyaniline

The unsubstituted polyaniline is synthesized by the chemical oxidative polymerization of aniline in 1N HCL using ammonium peroxydisulfate as an oxidizer. Polyaniline can also be oxidatively polymerized electroehemically as taught by W. Huang, B. Humphery, and A. G. Macdiarmid, J. Chem. Soc., Faraday Trans. 1, 82, 2385, 1986. In the chamicl synthesis, the conducting polyaniline:hydrochloride salt precipitates from solution. The polymerization is allowed to proceed for several hours after which the powder is filtered, washed with excess 1N hydrochloric acid. The polyanilinie:hydrochloride is then converted to the non-conducting or non-doped polyaniline base by reaction with 0.1M ammonium hydroxide. The polyaniline base is then filtered, washed with ammonium hydroxide, then washed with methanol and dried. The polymer in this stage is in the undoped base form as a powder.

The polymer is generally processed by taking the polyaniline base power and dissolving it in organic solvents, most commonly N-methylpyrrolidinone. This solution can be used to spin-coat thin films of the base polymer or can be used to solution cast thick films or can be used to fabricate structural parts of the polyaniline base. The substituted polyaniline derivatives are made by the oxidative polymerization of the appropriate substituted aniline monomer. Copolymers can also be made by the oxidative polymerization of one or more monomers. In addition different acids other than hydrochloric acid can be used in the synthesis.

Doping generally involves reaction with most commonly protonic acids. Other electrophiles can also be used as dopants, for example alkylating agents, etc. The doping can be done in solution or it can be done heterogeneously in the solid state. For example, the NMP solution of the polyaniline base can be used to spin-coat films of the polyaniline base. These films can be doped or made conducting by dipping into a solution of the appropriate acid such as 1N HCL, or aqueous toluene sulfonic acid or the vapor of the acid. The polyaniline base powder can also be doped by stirring in an aqueous solution of the dopant. The doping can also be carried out in solution which is generally preferred as it allows the conducting form to be processable. To the NMP solution of the polyaniline base is added the appropriate dopant, for example camphorsulfonic acid. The acid reacts with the polyaniline base to form the conducting polyaniline salt. Any other acid or electrophile can be used in the same manner. The conducting salt will either precipitate or remain in solution depending on the particular dopant used. If it stays in solution, the conducting solution can then be used to fabricate films of the conducting polyaniline by spin-coating, dip coating, spray-coating, etc. or fabricated into some structural components.

Typical experimental for the additives: The present invention uses additives in the starting solvent, eg. NMP. For example, 0.00001 wt % to 5 wt %, preferably 0.0001 to 2.5 %, and most preferably 0.001 to 1% ratio) LiCl is added to the NMP. The salt is allowed to dissolve in the NMP. To this solvent is added the polyaniline base powder and allowed to stir. Once the polyaniline base is dissolved, it is filtered through a 0.2 micron millipore filter and then to the filtered solution is added the dopant. Dopants used in this study include toluenesulfonic acid, camphor sulfonic acid, acrylamidopropanesulfonic acid, hydrochloric acid.

Figure 12:
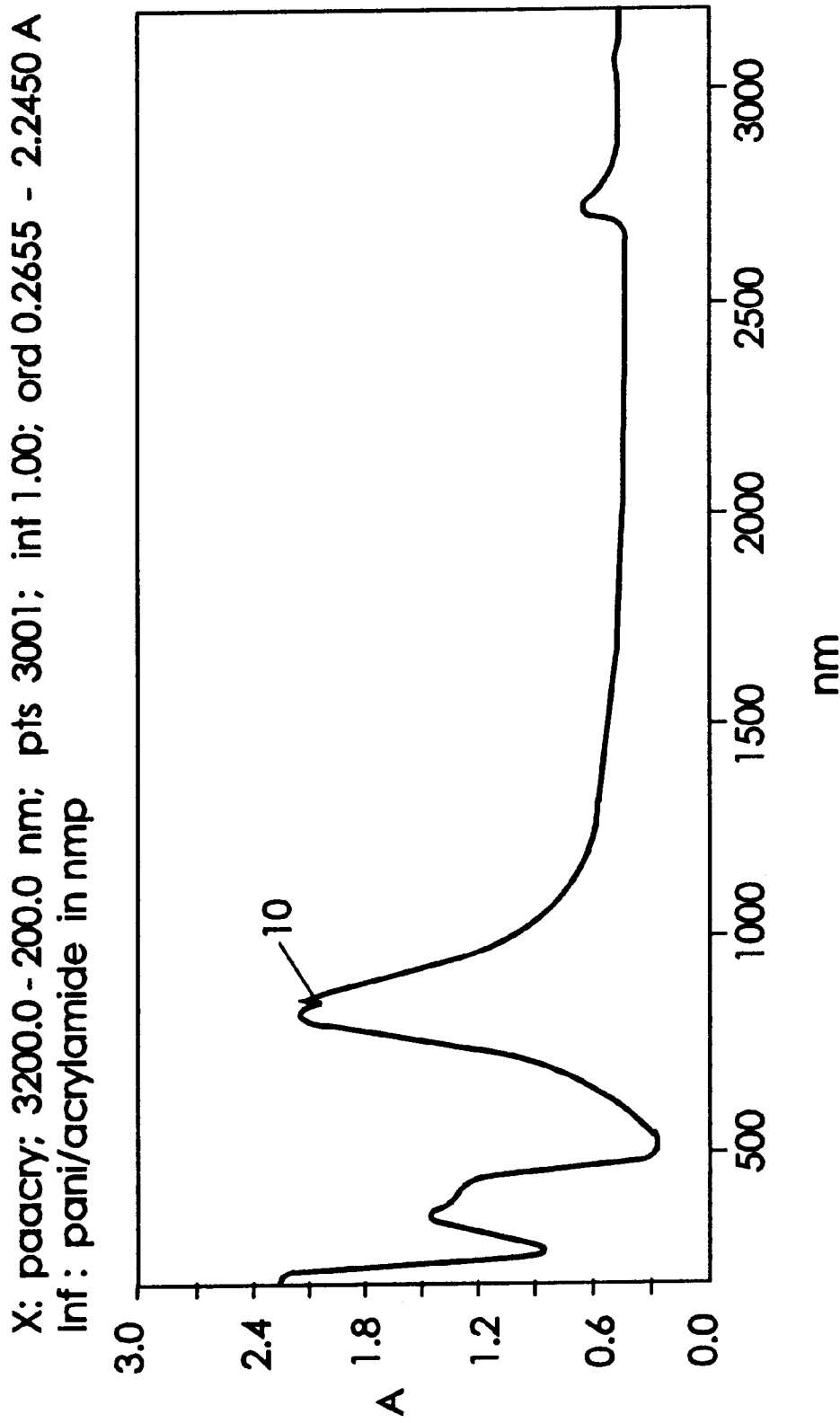
FIG. 12 shows a UV/VIS/near IR spectrum of polyaniline doped with an organic sulfonic acid in NMP showing a localized polaron peak.
Figure 13:
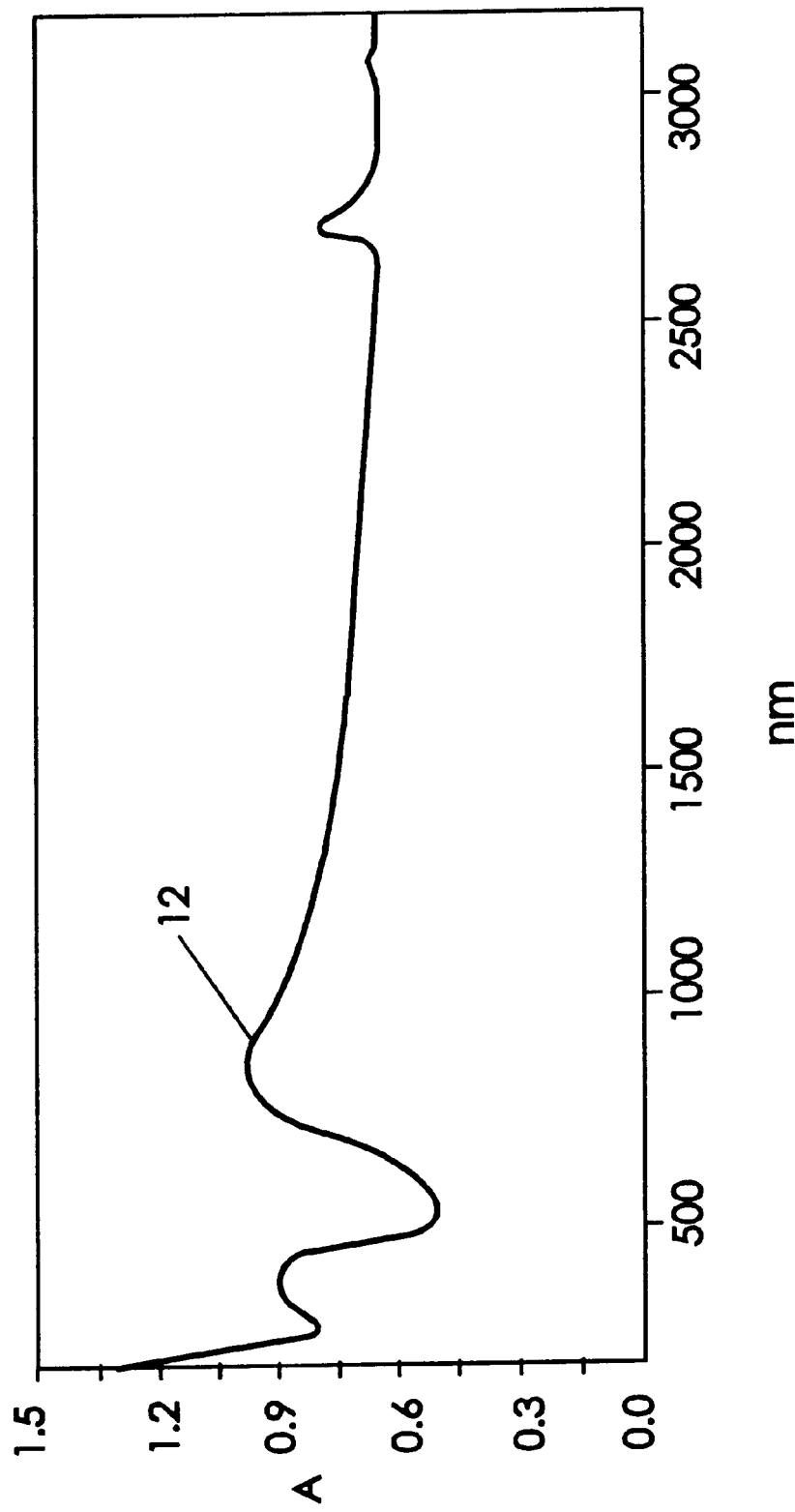
FIG. 13 shows the same plot as FIG. 12 but with 0.5 wt % LiCl added to the initial NMP solution from which the doped polyaniline was cast and shows a delocalization of the polaron peak.
Figure 14:
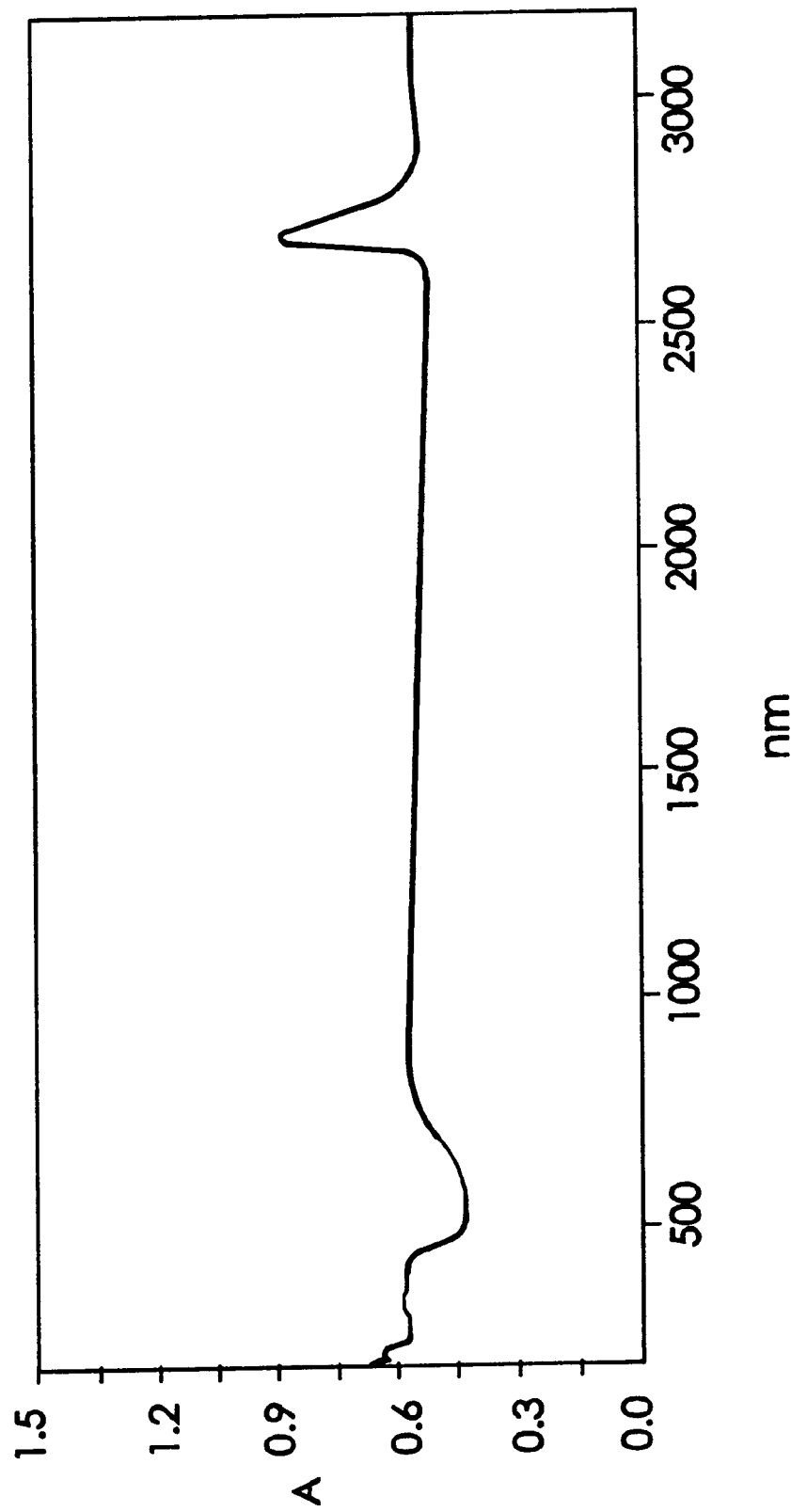
FIG. 14 shows the same plot as in FIG. 12, but with 1wt % LiCl added to the initial NMP solution from which the doped polyaniline was cast and shows a significantly delocalized polaron peak.

The conductivity of the polyaniline salt is found to depend oil the processing conditions. Generally polyaniline doped heterogeneously with aqueous 1N HCL gives conductivity on the order of approx. 1 S/cm. Doping in NMP generally gives much lower conductivity (approx. 0.1 S/cm). A great deal of variation in conductivity has been observed depending on the solvent system used for doping. When a polyaniline base is doped in NMP with an organic sulfonic acid a localized polaron peak is observed on the ultraviolet-visible near IR spectrum. When this film is exposed to m-cresol a highly delocalized polaron peak is observed extending out to 2500 nm with the conductivity increasing to hundreds of S/cm. Conductivity of 0.2 S/cm is attained when an NMP solution of the polyaniline base is reacted with camphorsulfonic acid or acrylamidopropanesulfonic acid. The uv/visible/near IR spectrum for the polyaniline doped with acrylamidopropane sufonic acid is shown in FIG. 12. As can be seen a localized polaron peak 10 is attained. When 0.5 wt. % LiCl is added to the NMP, a delocalized polaron peak 12 (FIG. 13) is attained and with 1 wt. % LiCl a highly delocalized polaron peak is attained (FIG. 14). This delocalized polaron is indicative of higher conductivity is a result of more highly delocalize carriers.

Also, an NNP/additive (e.g. LiCl) solvent system was used to spin-coat the polyaniline base films. The UV of the base also shows a red shift to longer wavelengths with the incorporation of additives as compared to films cast from 100% NMP. This red shift is indicative of an extension of the conjugation length. When these films are doped with hydrochloric acid vapor, the films which include the lithium chloride show a more highly delocalized polaron peak as compared to the NMP film alone.

The additives can also be surfactants such as nonylphenol or the tritons. The triton for example is dissolved in the NMP prior to the addition of the pani base as described above. This solution was used to cast thick films of the pani base. Upon doping of the thick films with hydrochloric acid, the conductivity of the film was 11 S/cm for the triton containing film; 40 S/cm for the nonylphenol containing film; and only 1 S/cm for the NMP only film.

Films processed according to the present invention can give rise to enhanced stretch orientation and a corresponding increase in electrical conductivity.

Figure 21:
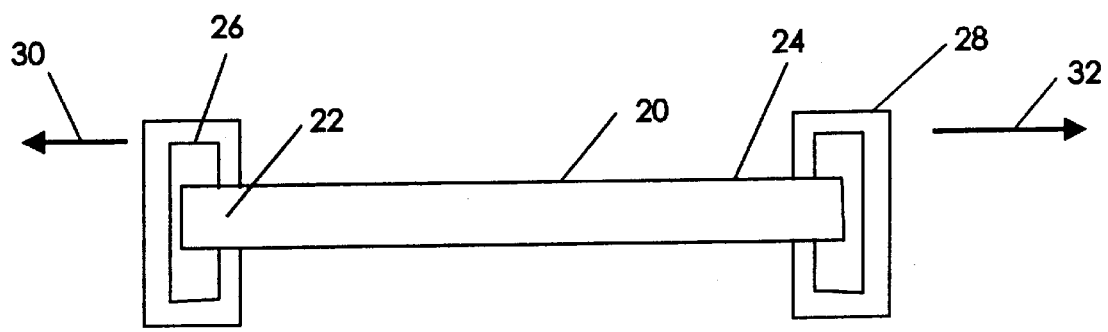
FIG. 21 schematically shows stretch orientation of a film to enhance electrical conductivity.

FIG. 21 schematically shows an undoped deaggregated film 20 held at end 22 and end 24 by clamps 26 and 28 respectively. Ends 22 and 24 are pulled apart as indicated by arrows 30 and 32, respectively. The molecules in the deaggregated film are unravelled and therefore when film 20 is stretched there is increased propensity for alignment of the molecules in the stretch direction and thereby enhanced electrical conductivity in the stretch direction.

Solutions processed according to the present invention exhibit enhanced shelf life stability. Polyaniline solutions in general tend to gel over time. The time for gelling to occur is dependent on solvent and concentration of solids in solution. For example, a solution of polyaniline base in NMP made to 5% solids be weight tends to gel within days. Solutions higher in solids content gel within minutes. Gellation limits the full use of the polyaniline solutions for many applications. Gellation occurs because of interactions between chains, most probably hydrogen bonding. As the hydrogen bonding between chains increase, chain entanglements increase. As this entangled or highly aggregated structure is less soluble than the non-aggregated structure, the solutions of the aggregated structure in turn gel. The addition of salts such as lithium chloride, for example, breaks the interchain hydrogen bonds and in turn prevents the solution from gelling thereby enhancing the long term shelf life stability of the polyaniline solutions. Also, the use of these additives allows higher solids polyaniline solutions to be made (higher than can normally be made without the additives) with good shelf life stability.

While the present invention has been described with respect to preferred embodiments, numerous modifications, changes, and improvements will occur to those skilled in the art without departing from the spirit and scope of the invention.

What is claimed is:

1. A non-electrically conductive composition of matter comprising polymer molecules selected from the group consisting of substituted and unsubstituted polyparaphenylenes, polyparaphenylevevinylenes, polyanilines, polyazines,polythiophenes, poly-p-phenylene sulfides, polyfuranes, polypyrroles, polyselenophenes, polyacetylenes formed from soluble precursors and combinations thereof and blends thereof with other polymers and copolymers of monomers thereof and a salt, said salt is less than about 2.5 wt % of said composition of matter.

2. A composition of matter according to claim 1, wherein said salt is selected from the group consisting of lithium salts, magnesium salts, sodium salts, potassium salts, rubidium salts, cesium salts, calcium salts, barium salts, tetrabutylammonium salts, tetraethyl ammonium salts, tetramethyl ammonium salts and tetrapentyl ammonium salts.

3. A composition of matter according to claim 1 having aggregated regions, the amount of said deaggregating agent is sufficient to reduce the dimensions of said aggregated regions.

4. A composition of matter comprising polymer molecules in nonelectrically conductive form having regions of aggregation less than 100 nm, said polymer molecules being selected from the group consisting of one or more of substituted and unsubstituted polyparaphenylenes, polyparaphenylenevinylenes, polyanilines, polyazines, polythiophenes, poly-p-phenylene sulfides, polyfuranes, polypyrroles, polyselenophenes, polyacetylenes formed from soluble precursors and combinations thereof and blends thereof with other polymers and copolymers of monomers thereof and a salt as a deaggregating agent, said salt is selected from the group consisting of one or more of lithium salts, magnesium salts, sodium salts, potassium salts, rubidium salts, cesium salts, calcium salts, barium salts, tetrabutylammonium salts, tetraethyl ammonium salts, tetramethyl ammonium salts and tetrapentyl ammonium salts, said salt is less than about 2.5 wt % of said composition of matter.

5. A composition of matter comprising nonelectrically conductive polymer molecules having regions of aggregation less than 100 nm, said polymer molecules being selected from the group consisting of one or more of substituted and unsubstituted polyparaphenylenes, polyparaphenyienevinylenes, polyanilines, polyazines, polythiophenes, poly-p-phenylene sulfides, polyfuranes, polypyrroles, polyselenophenes, polyacetylenes formed from soluble precursors and combinations thereof and blends thereof with other polymer sand copolymers of monomers thereof and phenol in an amount from about 0.0001 wt % to about 25 wt % of said composition;

said composition of matter is a material formed by a method comprising exposing a precursor material comprised of a plurality of said polymer molecules in undoped form, first to said deaggregating agent, said precursor material has regions of aggregation, said regions of aggregation resulting from interactions between said polymer molecules in undoped form, wherein said deaggregating agent complexes with said polymer molecules in undoped form substantially reducing said interaction resulting in regions of aggregation less than about 100 Å.

6. A composition of matter comprising nonelectrically conductive polymer molecules having regions of aggregation less than 100 nm, said polymer molecules being selected from the group consisting of one or more of substituted and unsubstituted polyparaphenylenes, polyparaphenyienevinylenes, polyanilines, polyazines, polythiophenes, poly-p-phenylene sulfides, polyfuranes, polypyrroles, polyselenophenes, polyacetylenes formed from soluble precursors and combinations thereof and blends thereof with other polymer sand copolymers of monomers thereof and phenol in an amount from about 0.001 wt % to about 15 wt % of said composition;

said composition of matter is a material formed by a method comprising exposing a precursor material comprised of a plurality of said polymer molecules in undoped form, first to said deaggregating agent, said precursor material has regions of aggregation, said regions of aggregation resulting from interactions between said polymer molecules in undoped form, wherein said deaggregating agent complexes with said polymer molecules in undoped form substantially reducing said interaction resulting in regions of aggregation less than about 100 Å.

7. A composition of matter comprising nonelectrically conductive polymer molecules having regions of aggregation less than 100 nm, said polymer molecules being selected from the group consisting of one or more of substituted and unsubstituted polyparaphenylenes, polyparaphenyienevinylenes, polyanilines, polyazines, polythiophenes, poly-p-phenylene sulfides, polyfuranes, polypyrroles, polyselenophenes, polyacetylenes formed from soluble precursors and combinations thereof and blends thereof with other polymer sand copolymers of monomers thereof and phenol in an amount from about 0.01 wt % to about 10 wt % of said composition;

said composition of matter is a material formed by a method comprising exposing a precursor material comprised of a plurality of said polymer molecules in undoped form, first to said deaggregating agent, said precursor material has regions of aggregation, said regions of aggregation resulting from interactions between said polymer molecules in undoped form, wherein said deaggregating agent complexes with said polymer molecules in undoped form substantially reducing said interaction resulting in regions of aggregation less than about 100 Å.

* * * * *